US012727605B2

(12) United States Patent
Elsom et al.

(10) Patent No.: US 12,727,605 B2
(45) Date of Patent: Sep. 8, 2026

(54) INVERTER MOTOR DRIVE FOR FROZEN CONFECTION MACHINE AND PROCESS FOR CONTROLLING A FROZEN CONFECTION MACHINE

(71) Applicant: H.C. Duke & Son, LLC, East Moline, IL (US)

(72) Inventors: Kyle B. Elsom, Le Claire, IA (US); Dustin Meyermann, East Moline, IL (US); Joshua Otto, Bettendorf, IA (US)

(73) Assignee: H.C. Duke & Son, LLC, East Moline, IL (US)

( * ) Notice: Subject to any disclaimer, the term of this patent is extended or adjusted under 35 U.S.C. 154(b) by 111 days.

(21) Appl. No.: 18/662,379

(22) Filed: May 13, 2024

(65) Prior Publication Data

US 2024/0292860 A1 Sep. 5, 2024

Related U.S. Application Data

(63) Continuation-in-part of application No. 16/876,803, filed on May 18, 2020, now Pat. No. 12,004,532.

(60) Provisional application No. 62/849,396, filed on May 17, 2019.

(51) Int. Cl.

| | |
|---|---|
| ***H02P 27/06*** | (2006.01) |
| ***A23G 9/12*** | (2006.01) |
| ***A23G 9/22*** | (2006.01) |

(52) U.S. Cl.

CPC .............. *A23G 9/228* (2013.01); *A23G 9/12* (2013.01); *A23G 9/224* (2013.01); *H02P 27/06* (2013.01)

(58) Field of Classification Search

CPC .......... A23G 9/228; A23G 9/12; A23G 9/224; A23G 9/22; F25C 2600/04; F25C 2301/002; H02P 27/06

USPC ................................................ 62/135, 228.2

See application file for complete search history.

(56) References Cited

U.S. PATENT DOCUMENTS

| | | | | |
|---|---|---|---|---|
| 4,747,272 | A | 5/1988 | Howell et al. | |
| 11,758,920 | B1 | 9/2023 | Frank et al. | |
| 12,004,532 | B2 * | 6/2024 | Elsom | A23G 9/12 |
| 2005/0081554 | A1 | 4/2005 | Ross | |
| 2009/0133429 | A1 | 5/2009 | Petersen | |
| 2009/0211269 | A1 | 8/2009 | Gist et al. | |
| 2012/0017634 | A1 * | 1/2012 | Dorman | F04C 28/08 418/201.2 |
| 2014/0033746 | A1 * | 2/2014 | Mcsweeney | F25B 49/022 62/115 |
| 2014/0311416 | A1 | 10/2014 | Stiles, Jr. et al. | |
| 2016/0047184 | A1 | 2/2016 | Luharuka et al. | |
| 2020/0321824 | A1 * | 10/2020 | Selvaraj | F04C 13/008 |
| 2023/0025966 | A1 | 1/2023 | Macaluso et al. | |
| 2023/0054112 | A1 | 2/2023 | Rollins et al. | |
| 2023/0234011 | A1 | 7/2023 | Lazzarini et al. | |

* cited by examiner

*Primary Examiner* — Marc E Norman

(74) *Attorney, Agent, or Firm* — Dinsmore & Shohl LLP

(57) ABSTRACT

A frozen confection dispensing apparatus includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a speed and/or torque of the beater motor regulating a size of ice crystals and overrun of a frozen confection product.

19 Claims, 2 Drawing Sheets

INVERTER MOTOR DRIVE FOR FROZEN CONFECTION MACHINE AND PROCESS FOR CONTROLLING A FROZEN CONFECTION MACHINE

CROSS-REFERENCE TO RELATED APPLICATIONS

This application is a continuation-in-part of U.S. application Ser. No. 16/876,803, filed May 18, 2020, which in turn claims priority of U.S. Provisional Application Ser. No. 62/849,396, filed May 17, 2019, the contents of both which are incorporated herein by reference.

TECHNICAL FIELD

The present disclosure relates to a frozen confection dispensing apparatus and with more particularity to a frozen confection dispensing apparatus including a variable frequency drive

BACKGROUND

Generally, there have been efforts regulate the product consistency of a frozen confection machine. The consistency is regulated by controlling the percentage of the mixture that is frozen, and by regulating the ice crystal size. As the product consistency varies, different textures and mouth feel of the product are achieved. This ranges from a smooth and creamy product, to a course and grainy product, depending on the desired attributes and the type of product being frozen. The products ability to incorporate air to achieve varying levels of overrun (% expansion from the liquid state to the frozen state) is also affected by the products consistency. The key attributes that affect the consistency of a mix are the ice crystal size and the percentage of the mix that is allowed to freeze (ice fraction). The ice fraction of the mix can be measured by monitoring the power supplied to the mix drive motor. As a greater portion of the mix is frozen, the load on the mix motor increases. This in turn requires an increase in the supply current to the motor to increase the output torque. The capacity of the refrigeration system is then regulated by cycling the refrigeration compressor based on the measured motor current value.

Ice crystal size is regulated by the rate at which the ice is generated vs. the speed that it is harvested. The ice is harvested by rotating a scrapper blade around the cylinder wall. These are typically driven at a fixed speed. Typically, ice crystal size is controlled by matching blade designs at a fixed rotational speed to the rate at which the ice is generated. Such as system may be difficult to control to provide a specified ice crystal size. Typically, problems can arise with conventional monitoring technologies due to supply voltage variations. Nominal supply voltages range from 208 V+/−10% to 230 V +/−10%. Motors are typically optimized at a specific voltage.

There is therefore a need in the art for an improved system and method of controlling ice crystal size and overrun in a frozen confection machine.

SUMMARY

In one aspect, there is disclosed a frozen confection dispensing apparatus that includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a speed of the beater motor regulating a size of ice crystals of a frozen confection product.

In another aspect, there is disclosed there is disclosed a frozen confection dispensing apparatus that includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a torque of the beater motor regulating a size of ice crystals and overrun of a frozen confection product.

DETAILED DESCRIPTION OF THE PREFERRED EMBODIMENTS

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

Figure 1:
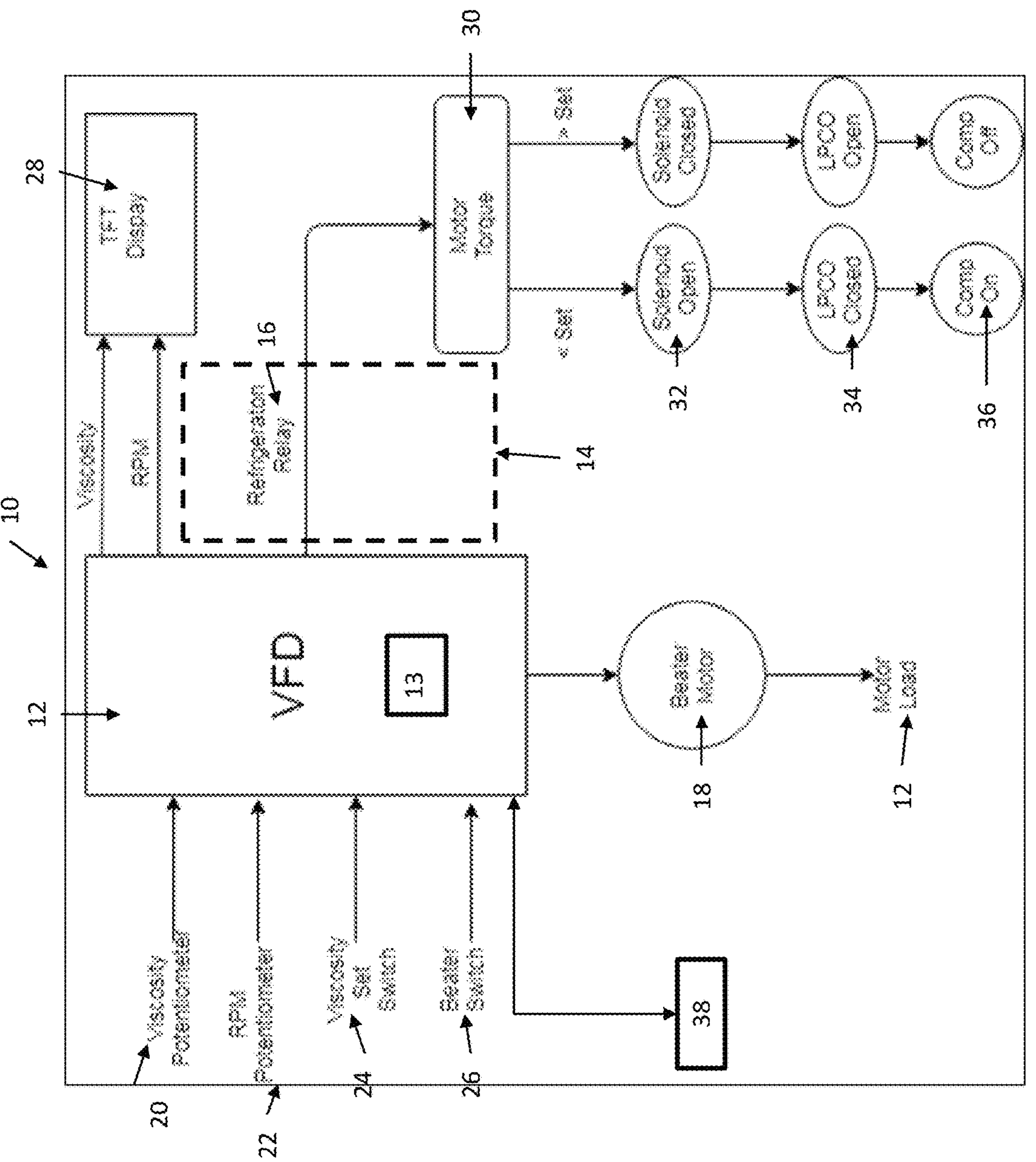
FIG. 1 schematically depicts a schematic drawing of a first aspect of a frozen confection machine, according to one or more embodiments shown and described herein.

Referring to FIG. 1, there is shown a portion of a frozen confection machine 10. The frozen confection machine 10 includes a variable frequency drive (VFD) 12 communicatively coupled to a refrigeration system 14. The refrigeration system is structured to freeze a frozen confection base product. Such refrigeration systems are generally known in the art. The refrigeration system 14 includes a refrigeration relay 16 that may be utilized to start and stop the refrigeration cycle. The VFD 12 is also communicatively coupled to a beater motor 18. The beater motor 18 mixes a product mixture within the refrigeration section and may be either an AC or DC motor. The product mixture may be frozen such that it has a desired consistency and ice crystal size for a specified product.

The VFD 12 receives several inputs including data from a viscosity potentiometer 20, data from a RPM potentiometer 22, data from a viscosity set switch 24 and data from a beater motor switch 26 (each of which may be communicatively coupled to the VFD 12). The viscosity and RPM data may be indicated on a display 28 communicatively coupled with the VFD 12.

In one aspect, the VFD 12 includes a frequency inverter 13 to regulate the speed and monitor the power supplied to the beater motor 18. The frequency inverter 13 varies the incoming power supply to the beater motor 18 to allow the speed to be regulated by varying the supply frequency and voltage. In addition, the frequency inverter 13 may measure the power supplied to the beater motor 18.

The VFD 12 has the ability to regulate the power and speed of the beater motor 18 such that the torque to current relationship is kept nearly constant. As the voltage dips below its nominal values, speed is decreased such that the peak current and therefore peak torque are maintained. If the voltage supply is above the nominal value for the motor, the frequency inverter 13 will regulate the supplied voltage such that the nominal value is maintained. This keeps the peak current at a constant value, and prevents the motor from become saturated. At saturation, increases in motor current do not provide any additional increase in torque. By maintaining the current to torque relationship throughout the rated voltage range, the measured torque of the beater motor 18 and the associated consistency of the frozen mixture are kept constant.

This is in contrast to traditional power monitoring devices. As voltage varies, the relationship between measured current and output torque also begins to vary. In some cases, as the voltage is increased, the load current to the motor raises dramatically. This affects the ability of the controller to recognize when to turn the refrigeration system on in response to load. This can result in variations in product constancy. The result is a very narrow voltage operating range. Onsite voltage conditioning such as buck boost transformers are employed in some cases to compensate for local voltage variations. However, these are proportional devices, as the incoming voltage varies, so does the supply voltage to the machine. Fluctuations during the day will cause product consistency to vary using these conventional systems.

With the speed (RPM) known, the frequency inverter 13 can calculate the torque supplied to the beater motor to harvest the ice and to agitate the product mixture in a controlled manner. The ability to vary speed (RPM) and precisely measure motor torque 30 allows the ice crystal size to be controlled. As shown in FIG. 1, if the motor torque is less than a set value, the solenoid 32 is open, the low pressure cut out (LPCO) is closed and the compensation setting is ON. Further, if the motor torque is greater than a set value, the solenoid 32 is closed, the low pressure cut out (LPCO) is open and the compensation setting is OFF.

In one aspect, product attributes such as the consistency and ice crystal size will vary based on the product. Water ice, sorbet, ice cream, and gelatos all have unique product attributes. By varying the speed and regulating the refrigeration system 14 based on motor torques 30, the consistency can be controlled to achieve the desired product attributes depending on the product type.

To achieve thicker crystals, the harvest speed can be slowed at a given ice generation rate. Thinner crystals can be generated by increasing the speed at a given ice harvest rate. The allowable torque can be increased or decreased via the current settings to compensate for the variation in ice harvest rates, as well as the applied refrigeration capacity.

The VFD 12 may control the consistency of a frozen confection machine by regulating and measuring the torque. The torque may be measured by sending a scaled value of the torque current to a controller 38, which will activate and deactivate the refrigeration system 14 based on this value. Additionally, the VFD 12 may vary the speed of a frozen confection machine while at the same time varying the allowable torque to regulate the size of the ice crystals developed. The VFD 12 may further be used by setting the regulated speed at the minimum supplied voltage. This insures that the base speed will not need to be compensated to maintain the peak torque requirements. The base speed or base torque settings may be adjusted by an input to the VFD 12. In one aspect, the controller 38 may automatically adjust the allowable torque and the cut in and cut out differential of the refrigeration system 14 as the speed is varied to maintain a consistent ice crystal size.

In one aspect, there are different types of frozen confection machines. The two basic types are 1) demand based machines, where product is frozen and maintained in a barrel at the desired temperature and consistency, and product is dispensed on demand, and 2) batch type machines, where the product is frozen and then dispensed as a single batch. In some cases, batch machines will hold the product for a short duration prior to dispensing the product.

The ability to regulate and control ice crystal size and consistency has advantages for both of these equipment types. In the batch machine application, the amount of air incorporated into the mix, producing overrun (percentage (%) expansion of the product from a liquid state), is affected by the percentage of frozen product and rotational speed of the beater motor 18. By varying the speed or RPM at critical points in the product freezing cycle, overrun can be more precisely controlled. In a liquid state, very little air is incorporated into the mix. As the product begins to freeze, air can become incorporated, so varying rotational speeds at this critical state are advantageous to regulate overrun. As the product reaches its desired ice fraction, typically 35-50% frozen, higher rotational speeds will begin to expel the air from the mixture. At this point in the cycle, lower rotational speeds are desired. By varying rotational speeds based on the frozen percentage of a product, overrun can be precisely regulated for a batch type freezer.

For a batch type frozen confection machine, the controller 38 and VFD 12 monitors the motor torque regulating the refrigeration system activation, and varies the speed of the beater motor 18. In one aspect, the beater motor RPM may be varied based on the measured torque at interim steps throughout the freeze cycle to optimize the level of overrun of the finished product. The controller 38 and VFD 12 may vary beater motor speed and torque to maintain the product at serving conditions for a limited time until the product is dispensed.

EXAMPLES

A batch frozen confection machine including a VFD with a three HP Inverter Duty Motor, and a 2.5 HP refrigeration system, was utilized. The system included input to the VFD provided by potentiometers for speed and viscosity settings. The VFD was programmed to accept this input, and adjust RPM, Viscosity, and Viscosity Hysteresis based on these inputs, and providing an analog signal back to a display to display the values of Speed and Viscosity.

Various torque and speed parameters were varied in the system as presented in Table 1 below for different products.

TABLE 1

| Product Consistency | | | | | | |
|---|---|---|---|---|---|---|
| Product | Hysteresis | Speed | Overrun | Crystal | Torque (lbf.in) | Temp |
| Water Ice | 25% | 200 | 0 | Grainy | 10-30 | 23-28 |
| Sorbet | 35% | 230 | 40% | Smooth | 40-50 | 18-20 |
| Ice Cream | 50% | 180 | 80-100% | Smooth | 50-60 | 22-24 |
| Gelato | 50% | 130 | 30-40% | Smooth | 80-95 | 18-19 |

As can be seen in the table, the system as described above may be utilized to produce a consistent water ice product.

The product included a grainy crystal with zero overrun. The product was produced by maintaining a speed of 200 rpm on the beater motor with regulating the torque from 10-30 lbf.in and regulating the temperature from 23-28 Fahrenheit.

As can be seen in the table, the system as described above may be utilized to produce a consistent sorbet product. The product included a smooth crystal with 40% overrun. The product was produced by maintaining a speed of 230 rpm on the beater motor with regulating the torque from 40-50 lbf.in and regulating the temperature from 18-20 Fahrenheit.

As can be seen in the table, the system as described above may be utilized to produce a consistent ice cream product. The product included a smooth crystal with 80-100% overrun. The product was produced by maintaining a speed of 180 rpm on the beater motor with regulating the torque from 50-60 lbf.in and regulating the temperature from 22-24 Fahrenheit.

As can be seen in the table, the system as described above may be utilized to produce a consistent gelato product. The product included a smooth crystal with 30-40% overrun. The product was produced by maintaining a speed of 130 rpm on the beater motor with regulating the torque from 80-95 lbf.in and regulating the temperature from 18-19 Fahrenheit.

Figure 2:
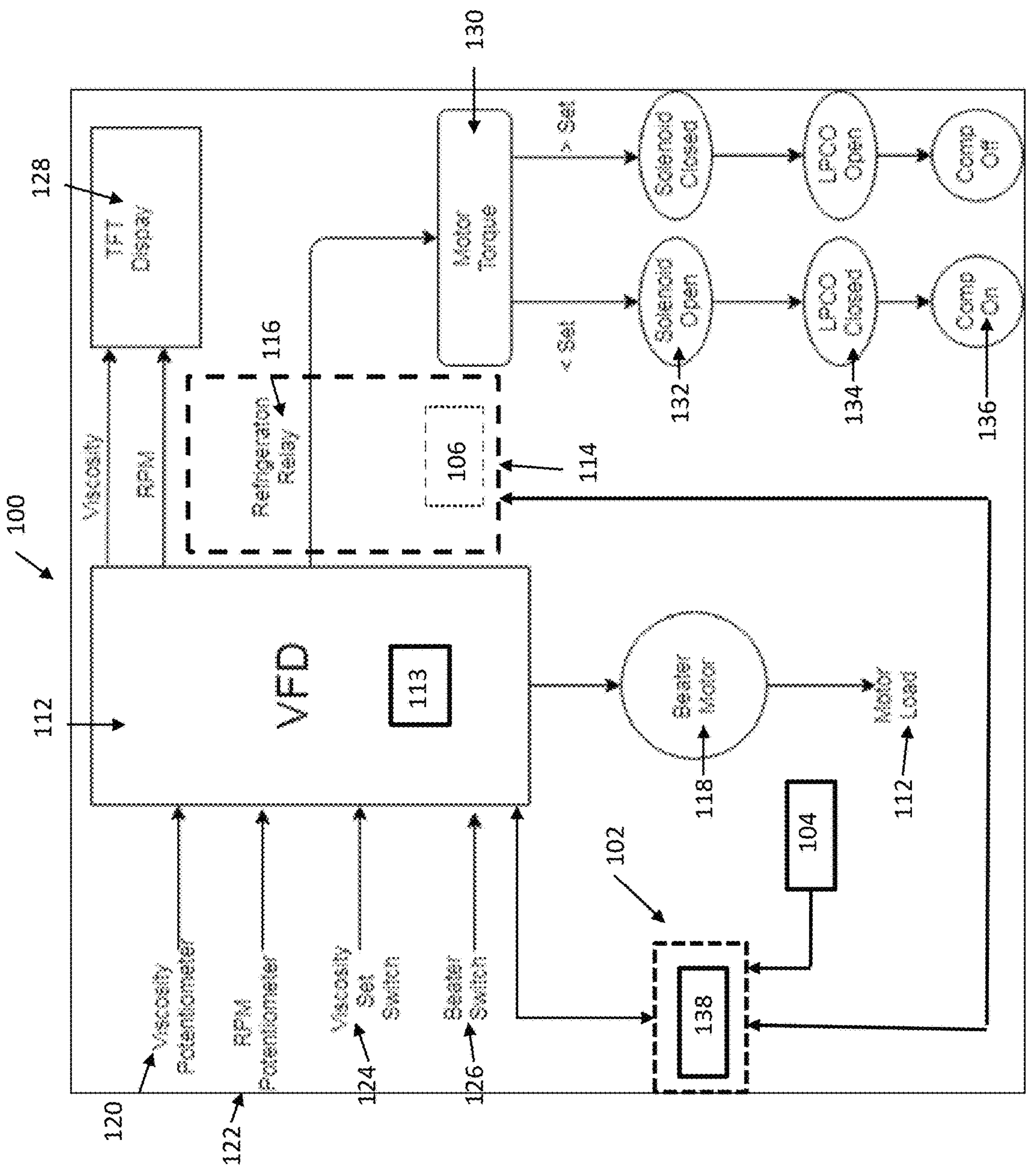
FIG. 2 schematically depicts a schematic drawing of a second aspect of a frozen confection machine, according to one or more embodiments shown and described herein.

Referring to FIG. 2, there is shown a portion of a second aspect frozen confection machine 100. It is understood that the second aspect frozen confection machine 100 is similar to the frozen confection machine 10 with the exceptions of the features described herein. As such, like features will use the same reference numerals with a prefix "1" for the reference numbers. As such, for brevity reasons, these features will not be described again.

In this aspect, the controller 138 is part of a machine control system 102 and may be referred to as a machine control device. The VFD 112 assesses the torque of the beater motor 118 and relays this data to the controller 38 of the machine control system 102. Subsequently, the machine control system 102 adjusts the speed of the beater motor 118 speed by providing speed commands or instruction signals through the inverter 113 of the VFD 112. Further, the controller 138 is configured to toggle the refrigeration system 114 between on and off states (e.g., activate and deactivate) to control and stabilize the ice crystal size in the frozen confection.

As such, the VFD 112 is communicatively coupled to the controller 138 and to the refrigeration system 114. The controller 138 is communicatively coupled to the refrigeration system 114 to provide commands to the relay 116 to activate and deactivate the refrigeration system 114. The VFD 112 calculates the beater motor torque and the controller 138 regulates the activation of the refrigeration system 114. Further, the controller 138 provides command signals to the VFD 112 and inverter 113 thereof to vary a speed of the beater motor 118, which regulates a size of ice crystals of a frozen confection product. Further, the controller 138 provides command signals to the VFD 112 and inverter 113 thereof to vary a speed of the beater motor regulating an overrun of a frozen confection product.

Further, in this aspect, the VFD 112 measures the torque output by of the beater motor 118 and communicates this data to the controller 138 of the machine control system 102. A temperature sensor 104 is configured to monitor the temperature of the frozen confection. The temperature sensor 104 is communicatively coupled to the machine control system 102 such that data related to the temperature of the frozen confection can be transmitted to the machine control system 102. In response, the machine control system 102 may then use both a temperature data from the temperature sensor 104 and a torque data from the beater motor 118 to regulate the speed of the beater motor 118 and to operate the refrigeration system 114. That is, in this aspect, with the speed (RPM) known, the controller 138 may calculate the torque supplied to the beater motor to harvest the ice and to agitate the product mixture in a controlled manner. The ability to vary speed (RPM) and precisely measure motor torque 130 allows the ice crystal size to be controlled. As shown in FIG. 2, if the motor torque is less than a set value, the solenoid 132 is open, the low pressure cut out (LPCO) 134 is closed and the compressor setting 136 is ON. Further, if the motor torque is greater than a set value, the solenoid 132 is closed, the low pressure cut out (LPCO) 134 is open and the compressor setting 136 is OFF. As such, the compressor setting 136 may be used switch the compressor between an OFF state and an ON state to vary pressure of a gas or liquid of the refrigeration system 114. As such, a gas or liquid may enter a compressor, as low-pressure, low-temperature gas or liquid, and leave the compressor, when the compressor is an ON state, as a high-pressure, high-temperature gas or liquid.

As such, the solenoid 132, the low pressure cut out (LPCO) 134 and the compressor setting 136 are manipulated by the control system 102 to vary a suction pressure of the refrigeration system 114 to set an evaporator pressure, thereby helping to control the size of the ice crystals. That is, an evaporator temperature is varied by adjusting an expansion device 106 of the refrigeration system 114 by using the low pressure cut out (LPCO) 134 and the compressor setting 136. For example, the evaporator temperature may be varied by adjusting the expansion device 106 of the refrigeration system 114 by using the low pressure cut out (LPCO) 134 in an OFF state, the compressor 136 in the ON state, as illustrated in the < set path.

Such arrangements and operations disclosed herein ensure the consistency and proper ice crystal size of the frozen product.

The controller 138 may be an electronic control unit, a central processing unit (CPU), and the like, for performing the functions as described herein. As such, the controller 138 may be configured to receive, analyze and process sensor data, perform calculations and mathematical functions, convert data, generate data, control system components (e.g., the beater motor 138, the refrigeration system 114, and the like), and the like. The control system 102 and/or the controller 138 may include one or more processors, and other components, for example one or more memory modules that stores logic that is executable by the one or more processors and a database that stores, for example, data related to torque data, temperature data, and the like. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), all their equivalents. Accordingly, the systems, methods, and/or processes, described herein may be implemented in any conventional computer programming language, as preprogrammed hardware elements, or as a combination of hardware and software components.

As such, in some embodiments, the controller 138 may be configured to set the regulated speed at a minimum supplied voltage and provide such commands to the VFD 112 for execution.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A frozen confection machine comprising:

a refrigeration system;

a controller communicatively coupled to the refrigeration system;

a variable frequency drive communicatively coupled to the controller and to the refrigeration system;

a beater motor connected to the variable frequency drive;

wherein the variable frequency drive calculates a beater motor torque and transmits a data indictive of the calculation to the controller, and the controller is configured to:

regulate the refrigeration system activation; and provide a command signal, based on the transmitted data, to the variable frequency drive to vary a speed of the beater motor regulating a size of ice crystals of a frozen confection product.

2. The frozen confection machine of claim 1, wherein the controller provides instructions to the variable frequency drive to vary a torque of the beater motor regulating the size of ice crystals of the frozen confection product.

3. The frozen confection machine of claim 1, wherein the variable frequency drive includes a frequency inverter that varies an incoming power supply to the beater motor controlling the speed of the beater motor.

4. The frozen confection machine of claim 3, wherein the frequency inverter regulates the power to maintain a current to torque relationship of the beater motor over a voltage range wherein a measured torque of the beater motor is kept constant.

5. The frozen confection machine of claim 1, wherein the variable frequency drive is configured to vary the speed and a torque of the beater motor to regulate the size of ice crystals of the frozen confection product.

6. The frozen confection machine of claim 1, wherein the frozen confection product is a water ice and the speed is set at 200 rpm and the torque is varied from 10 to 30 lbf.in at a temperature of from 23-28 Fahrenheit producing a product with a grainy crystal and zero percent overrun.

7. The frozen confection machine of claim 1, wherein the frozen confection product is a sorbet and the speed is set at 230 rpm and the torque is varied from 40 to 50 lbf.in at a temperature of from 18-20 Fahrenheit producing a product with a smooth crystal and forty percent overrun.

8. The frozen confection machine of claim 1, wherein the frozen confection product is a ice cream and the speed is set at 180 rpm and the torque is varied from 50 to 60 lbf.in at a temperature of from 22-24 Fahrenheit producing a product with a smooth crystal and eighty to one hundred percent overrun.

9. The frozen confection machine of claim 1, wherein the frozen confection product is a gelato and the speed is set at 130 rpm and the torque is varied from 80 to 95 lbf.in at a temperature of from 18-19 Fahrenheit producing a product with a smooth crystal and thirty to forty percent overrun.

10. The frozen confection machine of claim 1, wherein the controller modifies a suction pressure of the refrigeration system to set an evaporator pressure, thereby controlling the size of the ice crystals.

11. A frozen confection machine comprising:

a refrigeration system;

a controller communicatively coupled to the refrigeration system;

a variable frequency drive communicatively coupled to the controller and to the refrigeration system;

a beater motor connected to the variable frequency drive;

wherein the variable frequency drive calculates the beater motor torque and transmits a data indictive of the calculation to the controller; and the controller is configured to:

regulate the refrigeration system activation; and provide a command signal, based on the transmitted data, to the variable frequency drive to vary a speed of the beater motor regulating an overrun of a frozen confection product.

12. The frozen confection machine of claim 11, wherein the variable frequency drive varies a speed of the beater motor regulating a size of ice crystals of the frozen confection product.

13. The frozen confection machine of claim 11, wherein the variable frequency drive includes a frequency inverter that varies an incoming power supply to the beater motor controlling the speed of the beater motor.

14. The frozen confection machine of claim 11, wherein the frequency inverter regulates the incoming power supply to maintain a current to torque relationship of the beater motor over a voltage range wherein a measured torque of the beater motor is kept constant.

15. The frozen confection machine of claim 11, wherein the variable frequency drive is configured to vary the speed and a torque of the beater motor to regulate the size of ice crystals of the frozen confection product.

16. The frozen confection machine of claim 11, wherein the frozen confection product is a water ice and the speed is set at 200 rpm and the torque is varied from 10 to 30 lbf.in at a temperature of from 23-28 Fahrenheit producing a product with a grainy crystal and zero percent overrun.

17. The frozen confection machine of claim 11, wherein the frozen confection product is a sorbet and the speed is set at 230 rpm and the torque is varied from 40 to 50 lbf.in at a temperature of from 18-20 Fahrenheit producing a product with a smooth crystal and forty percent overrun.

18. The frozen confection machine of claim 11, wherein the frozen confection product is a ice cream and the speed is set at 180 rpm and the torque is varied from 50 to 60 lbf.in at a temperature of from 22-24 Fahrenheit producing a product with a smooth crystal and eighty to one hundred percent overrun.

19. The frozen confection machine of claim 11, wherein the frozen confection product is a gelato and the speed is set at 130 rpm and the torque is varied from 80 to 95 lbf.in at a temperature of from 18-19 Fahrenheit producing a product with a smooth crystal and thirty to forty percent overrun.

* * * * *